(12) United States Patent
Riemenschneider et al.

(10) Patent No.: US 11,475,280 B2
(45) Date of Patent: Oct. 18, 2022

(54) DATA OBJECT CLASSIFICATION USING AN OPTIMIZED NEURAL NETWORK

(71) Applicants: Disney Enterprises, Inc., Burbank, CA (US); ETH ZÜRICH, Zurich (CH)

(72) Inventors: Hayko Jochen Wilhelm Riemenschneider, Zurich (CH); Leonhard Markus Helminger, Zurich (CH); Christopher Richard Schroers, Zurich (CH); Abdelaziz Djelouah, Zurich (CH)

(73) Assignees: Disney Enterprises, Inc., Burbank, CA (US); ETH Zurich, Zurich (CH)

( * ) Notice: Subject to any disclaimer, the term of this patent is extended or adjusted under 35 U.S.C. 154(b) by 422 days.

(21) Appl. No.: 16/808,069

(22) Filed: Mar. 3, 2020

(65) Prior Publication Data

US 2021/0150316 A1 May 20, 2021

Related U.S. Application Data

(60) Provisional application No. 62/936,125, filed on Nov. 15, 2019.

(51) Int. Cl.
*G06N 3/04* (2006.01)
*G06N 3/08* (2006.01)
(Continued)

(52) U.S. Cl.
CPC ......... *G06N 3/0481* (2013.01); *G06K 9/6259* (2013.01); *G06K 9/6267* (2013.01); *G06N 3/08* (2013.01); *G06V 10/75* (2022.01)

(58) Field of Classification Search
CPC ........ G06N 3/0481; G06N 3/08; G06V 10/75; G06V 10/764; G06V 10/7753
See application file for complete search history.

(56) References Cited

U.S. PATENT DOCUMENTS

2017/0262737 A1* 9/2017 Rabinovich .......... G06K 9/6267
2019/0102678 A1* 4/2019 Chang .................... G06K 9/627

OTHER PUBLICATIONS

"TensorFlow: Large-Scale Machine Learning on Heterogeneous Distributed Systems" by Abadi et al. (Mar. 2016).
(Continued)

*Primary Examiner* — Daniel G Mariam
(74) *Attorney, Agent, or Firm* — Farjami & Farjami LLP (57) ABSTRACT

A system includes a computing platform having a hardware processor and a memory storing a software code and a neural network (NN) having multiple layers including a last activation layer and a loss layer. The hardware processor executes the software code to identify different combinations of layers for testing the NN, each combination including candidate function(s) for the last activation layer and candidate function(s) for the loss layer. For each different combination, the software code configures the NN based on the combination, inputs, into the configured NN, a training dataset including multiple data objects, receives, from the configured NN, a classification of the data objects, and generates a performance assessment for the combination based on the classification. The software code determines a preferred combination of layers for the NN including selected candidate functions for the last activation layer and the loss layer, based on a comparison of the performance assessments.

20 Claims, 5 Drawing Sheets

(51) Int. Cl.
*G06K 9/62* (2022.01)
*G06V 10/75* (2022.01)

(56) References Cited

OTHER PUBLICATIONS

"Unsupervised Label Noise Modeling and Loss Correction" by Eric Arazo, Diego Ortego, Paul Albert, Noel E. O'Connor, and Kevin McGuinness. (2019).

"Taming Pretrained Transformers for Extreme Multi-label Text Classification" by Wei-Cheng Chang, Hsiang-Fu Yu, Kai Zhong, Yiming Yang, and Inderjit S. Dhillon. (Jun. 2020).

"Fast and Accurate Deep Network Learning by Exponential Linear Units (ELUS)" by Djork-Arn'e Clevert, Thomas Unterthiner, and Sepp Hochreiter. (ICLR Feb. 2016).

"A Tutorial on Multi-Label Learning" by Eva Gibaja and Sebastian Ventura. (ACM 2010).

"Exploring the Limits of Weakly Supervised Pretraining" by Mahajan et al. (May 2018).

"Robust Bi-Tempered Logistic Loss Based on Bregman Divergences" by Ehsan Amid, Manfred K. Warmuth, Rohan Anil, and Tomer Koren. (NeurIPS 2019).

"On Calibration of Modern Neural Networks" by Chuan Guo, Geoff Pleiss, Yu Sun, and Kilian Q. Weinberger. (PMLR 2017).

"Self-Normalizing Neural Networks" by Günter Klambauer, Thomas Unterthiner, Andreas Mayr, and Sepp Hochreiter. (NIPS 2017).

"Using Trusted Data to Train Deep Networks on Labels Corrupted by Severe Noise" by Dan Hendrycks, Mantas Mazeika, Duncan Wilson, and Kevin Gimpel. (NeurIPS 2018).

"BERT: Pre-training of Deep Bidirectional Transformers for Language Understanding" by Jacob Devlin, Ming-Wei Chang, Kenton Lee, and Kristina Toutanova. (May 2019).

"Learning Visual Features from LargeWeakly Supervised Data" by Armand Joulin, Laurens van der Maaten, Allan Jabri, and Nicolas Vasilache. (Nov. 2015).

"Classification with Noisy Labels by Importance Reweighting" by Tongliang Liu and Dacheng Tao. (Jul. 2015).

"MentorNet: Learning Data-Driven Curriculum for Very Deep Neural Networks on Corrupted Labels" by Lu Jiang, Zhengyuan Zhou, Thomas Leung, Li-Jia Li, and Li Fei-Fei. (2018).

"Confident Learning: Estimating Uncertainty in Dataset Labels" by Curtis G. Northcutt, Lu Jiang, and Isaac L. Chuang. (Oct. 2019).

"Learning with Confident Examples: Rank Pruning for Robust Classification with Noisy Labels" by Curtis G. Northcutt, Tailin Wu, and Isaac L. Chuang. (UAI 2017).

"Making Deep Neural Networks Robust to Label Noise: a Loss Correction Approach" by Patrini et al. (Mar. 2017).

"Revisiting Unreasonable Effectiveness of Data in Deep Learning Era" by Chen Sun, Abhinav Shrivastava, Saurabh Singh, and Abhinav Gupta. (Aug. 2017).

"Focal Loss for Dense Object Detection" by Tsung-Yi Lin, Priya Goyal, Ross Girshick, Kaiming He, and Piotr Dollar. (Feb. 2018).

"Deep Sparse Rectier Neural Networks" by Xavier Glorot, Antoine Bordes, and Yoshua Bengio. (AISTATS 2011).

"NLNL: Negative Learning for Noisy Labels" by Youngdong Kim, Junho Yim, Juseung Yun, and Junmo Kim. (Aug. 2019).

"Generalized Cross Entropy Loss for Training Deep Neural Networks with Noisy Labels" by Zhilu Zhang and Mert R. Sabuncu. (Nov. 2018).

\* cited by examiner

DATA OBJECT CLASSIFICATION USING AN OPTIMIZED NEURAL NETWORK

RELATED APPLICATION(S)

The present application claims the benefit of and priority to a pending Provisional Patent Application Ser. No. 62/936,125, filed Nov. 15, 2019, and titled "Loss for Resistance to Noise (LoRN)," which is hereby incorporated fully by reference into the present application.

BACKGROUND

Datasets are a subset of real-world distributions and contain biases and noise. Despite being carefully constructed, deep neural networks (NNs) trained as classifiers on noisy datasets tend to inherit their biases and errors. Those biases and errors present as noise in a dataset may take the form of incorrect labels applied to the data, missing labels, superfluous labels, as well as label frequency imbalance, for instance. Moreover, extreme noise is a typical characteristic of unstructured datasets including highly varied data for which it is often not feasible to utilize standard data preparation techniques, such as structuring or cleansing for example, before deep learning takes place.

A recent conventional solution to the problem of noisy datasets assigns a specific focus for each label and sample in the dataset. However, calculation of the focal loss requires additional weights and tuning, which limits the usefulness of the solution in applications for which it is not specifically designed. Another conventional approach relies on a pure softmax activation and multi-class cost calculation, but is typically not robust enough for unstructured data.

SUMMARY

There are provided systems and methods for performing data object classification using an optimized neural network, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing data object classification using an optimized neural network that overcome the drawbacks and deficiencies in the conventional art. It is noted that, in some implementations, the methods disclosed by the present application may be performed as substantially automated processes by substantially automated systems. It is further noted that, as used in the present application, the terms "automation," "automated", and "automating" refer to systems and processes that do not require the participation of a human user, such as a system operator. Although, in some implementations, a human system operator or administrator may review the performance of the automated systems described herein, that human involvement is optional. Thus, the methods described in the present application may be performed under the control of hardware processing components of the disclosed automated systems.

It is also noted that although the present concepts confer exceptional advantages over conventional solutions when training datasets are extremely noisy, those same concepts can be used to optimize training of neural networks using training datasets that are structured, cleansed, or otherwise lacking in significant noise in the form of mislabeled data, unlabeled data, superfluously labeled data, or label frequency imbalance.

Moreover, as defined in the present application, an artificial neural network, also known simply as a neural network (hereinafter "NN"), is a type of machine learning framework in which patterns or learned representations of observed data are processed using highly connected computational layers that map the relationship between inputs and outputs. A "deep neural network," in the context of deep learning, may refer to a neural network that utilizes multiple hidden layers between input and output layers, which may allow for learning based on features not explicitly defined in raw data. As used in the present application, a feature labeled as an NN refers to a deep neural network. Various forms of NNs may be used to make predictions about new data based on past examples or "training dataset." In various implementations, NNs may be trained as classifiers and may be utilized to perform image processing or natural-language processing.

Figure 1:
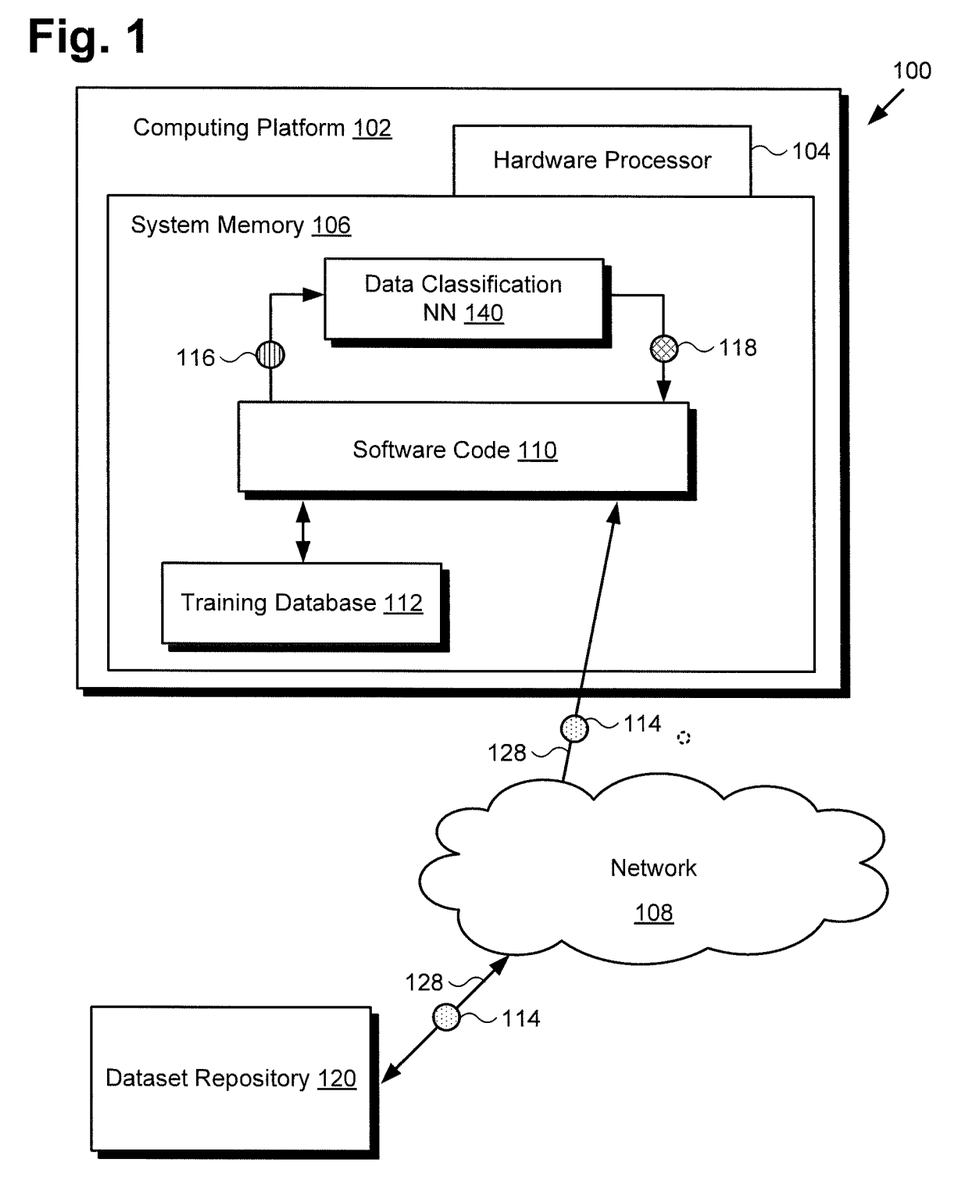
FIG. 1 shows a diagram of an exemplary system for classifying data objects, according to one implementation.

FIG. 1 shows a diagram of exemplary system 100 for classifying data objects, according to one implementation. As discussed below, system 100 may be implemented using a computer server accessible over a local area network (LAN) or may be implemented as a cloud-based system. As shown in FIG. 1, system 100 includes computing platform 102 having hardware processor 104, and system memory 106 implemented as a non-transitory storage device. According to the present exemplary implementation, system memory 106 stores software code 110, training database 112, and data classification NN 140.

As further shown in FIG. 1, system 100 is implemented within a use environment including communication network 108 and dataset repository 120. Also shown in FIG. 1 are network communication links 128 interactively connecting dataset repository 120 and system 100 via communication network 108, source data 114 obtainable from dataset repository 120 by system 100, training dataset 116 including multiple data objects, and classification 118 of the data objects included in training dataset 116, output by data classification NN 140.

It is noted that, although the present application refers to software code 110, data classification NN 140, and training database 112 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts software code 110, data classification NN 140, and training database 112 as being co-located in system memory 106, that representation is also provided merely as an aid to conceptual clarity. More generally, system 100 may include one or more computing platforms 102, such as computer servers for example, which may be co-located, or may form an interactively linked but distributed system, such as a cloud-based system, for instance.

As a result, hardware processor 104 and system memory 106 may correspond to distributed processor and memory resources within system 100. Thus, it is to be understood that software code 110, data classification NN 140, and training database 112 may be stored and/or executed using the distributed memory and/or processor resources of system 100. Computing platform 102 may correspond to one or more web servers, accessible over a packet-switched network such as the Internet, for example. Alternatively, computing platform 102 may correspond to one or more computer servers supporting a wide area network (WAN), a LAN, or included in another type of limited distribution or private network.

System 100 utilizes software code 110 to optimize the configuration of data classification NN 140 with respect to its performance and robustness to the presence of noise in training dataset 116. For example, such noise may include small margin and large margin label noise, label frequency imbalance in which one or more labels are present in training dataset 116 much more frequently than others, and/or the presence of a large number of data classes for the task of multi-label classification. In order to optimize the configuration of data classification NN 140, hardware processor 104 executes software code 110 to determine a preferred combination of activation and loss functions implemented by the activation and loss layers of data classification NN 140.

By way of context, in the domain of data classification, the conventional choices for loss functions have depended on the type of data being classified. For multi-label classification, the goal is to provide multiple labels within one classification result. For multi-class classification, by contrast, where the cardinality of the class is more than binary, only one class is active at a time. The softmax loss, or logistic loss, has traditionally been the preferred loss function for multi-class problems. For the multi-label problem, on the other hand, a sigmoid-based loss has traditionally been used. In each use case, however, either the softmax or the sigmoid function was used, but those activations were not used in combination. In the presence of noise, however, the performance of either activation function alone is suboptimal.

Figure 2:
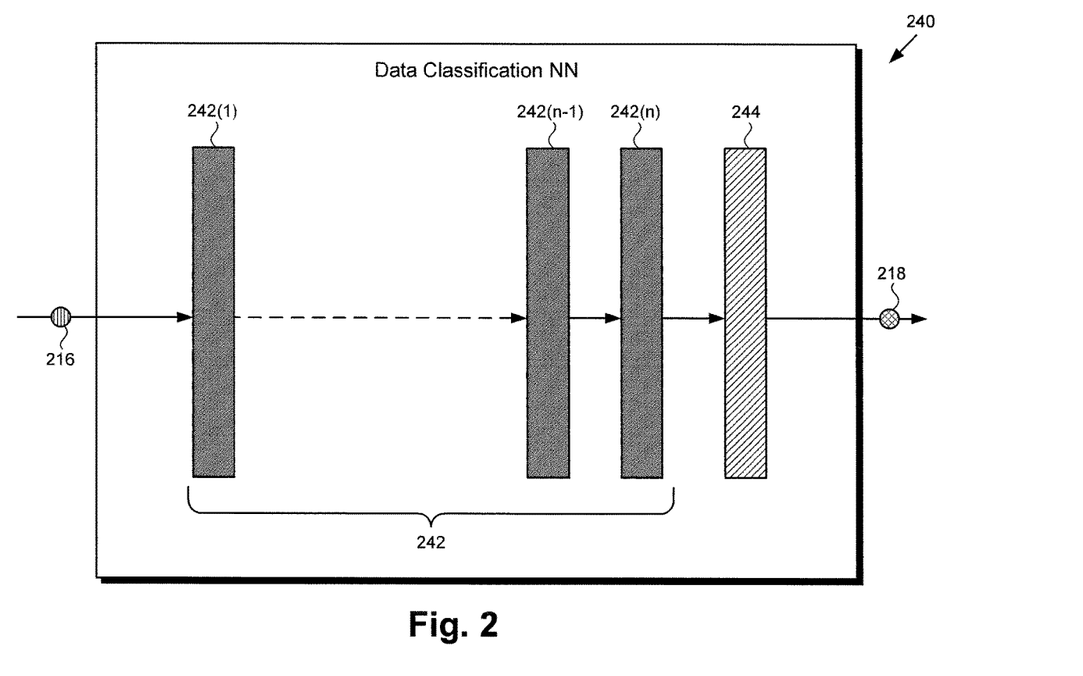
FIG. 2 shows an exemplary diagram of a data classification neural network suitable for use in the system of FIG. 1, according to one implementation.

Referring now to FIG. 2, FIG. 2 shows an exemplary diagram of data classification NN 240 suitable for use in system 100, in FIG. 1. As shown in FIG. 2, data classification NN 240 includes multiple "n" non-linear activation layers 242 (hereinafter "activation layers 242") including first activation layer 242(1) through last activation layer 242(n). In addition data classification NN 240 includes loss layer 244 following last activation layer 242(n). Also identified in FIG. 2 are activation layer 242(n−1) preceding last activation layer 242(n), training dataset 216, and classification 218 of data objects included in training dataset 216.

Training dataset 216 and classification 218 correspond respectively in general to training dataset 116 and classification 118, in FIG. 1, and those features may share any of the characteristics attributed to either corresponding feature by the present disclosure. In addition, data classification NN 240 corresponds in general to data classification NN 140, and those features may share the characteristics attributed to either corresponding feature by the present disclosure. That is to say, like data classification NN 240, data classification NN 140 may include multiple activation layers 242 including last activation layer 242(n), and loss layer 244.

It is noted that a basic NN includes a variety of layers such as loss layers, non-linear activation layers, and normalization layers. Those layers are typically used in well-established arrangements. However, as disclosed in the present application, when trained using a noisy training dataset, there are more effective alternative combinations of layers that can result in significant performance benefits.

It is further noted that the optimization solution disclosed herein models the noise learning as less strict learning to provide a continuous convergence on noisy labels, which are in turn less severely penalized. The combination of activation layers 242 normalizes the output values and further limits the output to an upper and lower bound. This allows the co-existence of noisy and correct labels.

Activation layers 242 may implement any of several candidate activation functions. One or more of activation layers 242 may take the form of a rectified linear unit (ReLU), exponential linear unit (ELU), or scaled ELU (SELU), or may implement sigmoid, softmax, or softplus activation functions, to name a few examples. Sigmoid and softmax activations both provide a normalization on top of the otherwise unbounded logit values to obtain probability values. The classical sigmoid activation function is defined as:

$$sigmoid(\hat{a}) = \frac{\exp(\hat{a})}{1+\exp(\hat{a})} = \frac{1}{1+\exp(-\hat{a})} \qquad \text{(Equation 1)}$$

with $\hat{a}$ being the activation of the previous layer. The result calculated per class individually is a softened response value $\hat{p}$, which is used as the predicted probability value in the loss function or functions. By contrast the softmax activation function incorporating all classes is defined as:

$$\text{softmax}(\hat{a}) = \frac{\exp(\hat{a})}{\sum_{j=1}^{K} \exp(\hat{a}_j)} = \exp\left(\hat{a}_i - \log\left(\sum_{j=1}^{K} \exp(\hat{a}_j)\right)\right) \quad \text{(Equation 2)}$$

The difference between the sigmoid and softmax activation functions being that sigmoid normalizes multiple independent classes on their own, whereas softmax normalizes over all classes and pushes the top activation further up.

Subsequent to the activation function implemented by the last activation layer 242($n$), the loss is calculated by loss layer 244 on top of the predicted values p of the last activation layer 242($n$). For multi-class classification tasks, the cross entropy loss function is typically employed to calculate the cost. The cross entropy loss function treats p as the conditional empirical distribution over the given class labels. It measures the uncertainty against a given ground truth distribution q within the K distinct classes. The cross entropy (hereinafter "CE") loss, also known as logistic loss due to its being identical except for a multiplicative constant, is defined as:

$$CE(p, q) = -\Sigma_{i=1}^{K} q_i \cdot \log(p_i) \quad \text{(Equation 3)}$$

where p is the predicted probability distribution and q is the static true distribution given by the labels. For multi-label classification problems, the CE is calculated over each label independently, similarly to binary cross entropy (hereinafter "BCE") loss, and results in a multi-label cross entropy (hereinafter "MCE") loss as:

$$MCE(p, q) = -\Sigma_{i=1}^{K} q_i \cdot \log(p_i) + (1-q_i) \cdot \log(1-p_i) \quad \text{(Equation 4)}$$

where for each class there is a single predicted probability value and its inverse. This effectively compares the two distributions (i.e., target and predicted), whereas the predicted distribution is evaluated under a log-likelihood. Since this requires valid distributions, there is the additional normalization effect of the above mentioned sigmoid and softmax.

Almost any combination of activation layers 242 and loss layer 244 is feasible. We continue to derive the following full loss functions for the standard cases of multi-class and multi-label. For example, combining last activation layer 242($n$) in the form of a softmax activation layer with loss layer 244 implementing a CE loss gives softCE as any of the following expressions:

$$softCE = -\sum_{i=1}^{K} q_i \cdot \log(\hat{p}^*) \quad \text{(Equation 5)}$$

$$softCE = -\sum_{i=1}^{K} q_i \cdot \log\left(\frac{\exp(\hat{a})}{\sum_{j=1}^{K} \exp(\hat{a}_j)}\right) \quad \text{(Equation 6)}$$

$$softCE = -\sum_{i=1}^{K} q_i \cdot \left(\hat{a}_i - \log\left(\sum_{j=1}^{K} \exp(\hat{a}_j)\right)\right) \quad \text{(Equation 7)}$$

where $\hat{p}^*$ is the softmax output of the activation $\hat{a}$. As shown above, the explicit form can be simplified into the classic form and its normalization can be subtracted.

Similarly, the sigmoid multi cross entropy sigMCE can be expressed as any of the following:

$$sigMCE = -\sum_{i=1}^{K} q_i \cdot \log(\hat{p}_i) + (1-q_i) \cdot \log(1-\hat{p}_i) \quad \text{(Equation 8)}$$

$$= -\sum_{i=1}^{K} q_i \cdot \log\left(\frac{\exp(\hat{a}_i)}{1+\exp(\hat{a}_i)}\right) + (1-q_i) \cdot \log\left(1 - \frac{\exp(\hat{a}_i)}{1+\exp(\hat{a}_i)}\right)$$

$$sigMCE = \sum_{i=1}^{K} q_i \cdot \log(1 + \exp(-a_i)) + (1-q_i) \cdot (a_i + \log(1 + \exp(-a_i))) \quad \text{(Equation 9)}$$

$$sigMCE = \sum_{i=1}^{K} a_i + \log(1 + \exp(-a_i)) - q_i \cdot a_i \quad \text{(Equation 10)}$$

$$= \sum_{i=1}^{K} \log(\exp(a_i)) + \log(1 + \exp(-a_i)) - a_i \cdot q_i$$

$$= \sum_{i=1}^{K} \log(\exp(a_i) \cdot (1 + \exp(-a_i))) - a_i \cdot q_i$$

$$= \sum_{i=1}^{K} \log(\exp(a_i) + 1) - a_i \cdot q_i$$

where $\hat{p}$ is the sigmoid output of the activation $\hat{a}$. As shown above, the explicit form can be significantly simplified due to the sigmoid.

A sigmoid activation followed by a CE loss leads to different penalty costs expressed as either of the following:

$$sigCE = \sum_{i=1}^{K} q_i \cdot \log(\hat{p}_i) \quad \text{(Equation 11)}$$

$$sigCE = \sum_{i=1}^{K} q_i \cdot \log\left(\frac{\exp(\hat{a}_i)}{\sum_{i=1}^{K} \exp(\hat{a}_i)}\right) \quad \text{(Equation 12)}$$

where just the active label portion is accumulated and the $\hat{p}$ is the sigmoid of the activation $\hat{a}$. This has the effect of normalization while only evaluating where the label is active.

Alternatively, combining softmax and MCE loss gives softMCE as:

$$softMCE = -\Sigma_{i=1}^{K} q_i \cdot \log(\hat{p}^*_i) + (1-q_i) \cdot \log(1-\hat{p}^*_i) \quad \text{(Equation 13)}$$

where both the active and inactive labels are accumulated and the $\hat{p}^*$ is the softmax of the activation $\hat{a}$. As interesting as the above combinations are, even more interesting are combinations including activation layer 242($n$-1) as well as last activation layer 242($n$) and loss layer 244. Those combinations can advantageously lead to aggregation of the normalization effects imposed by each of activation layer 242($n$-1) and last activation layer 242($n$) alone, for example by applying a softmax cross entropy over a sigmoid activation, or vice versa.

As a specific example, activation layer 242($n$-1) implementing a sigmoid activation function, followed by last activation layer 242($n$) implementing a softmax activation function, followed by loss layer 244 implementing a CE loss function results in:

$$sigsoftCE = -\Sigma_{i=1}^{K} q_i \cdot (\hat{p}_i - \log(\Sigma_{j=1}^{K} \exp(\hat{p}_j))) \quad \text{(Equation 14)}$$

with $\hat{p}$=sigmoid($\hat{a}$). This evaluates explicitly to either of the following expressions:

$$sigsoftCE = -\sum_{i=1}^{K} q_i \cdot \log\left(\frac{\exp(\hat{a}_i)}{\sum_{i=1}^{K}\exp(\hat{a}_i)}\right) \quad \text{(Equation 15)}$$

$$sigsoftCE = -q_i \cdot \log\left(\sum_{j=1}^{K}\exp\left(\frac{\exp(\hat{a}_j)}{1+\exp(\hat{a}_j)}\right)\right) \quad \text{(Equation 16)}$$

This also shows a normalization effect on active labels and bounds the activation values for the subsequent softmax layer. The maximal value after the sigmoid will be one, and hence the softmax is normalized due to its bounded input, similar to "double exponential" functions.

As another specific example, instead of the last activation layer 242($n$) implementing a softmax activation function, it may implement an $L_1$-normalization function. That is to say, in one implementation, activation layer 242($n$-1) may implement a sigmoid activation function, followed by last activation layer 242($n$) implementing an $L_1$-normalization function, followed by loss layer 244 implementing a CE loss function, resulting in:

$$signormCE = \Sigma_{i=1}^{K} q_i \cdot \log(\hat{p}^*_i) \quad \text{(Equation 17)}$$

where $\hat{p}^*$ is defined as:

$$\hat{p}^*(\hat{a}) = \frac{sigmoid(\hat{a}_i)}{\sum_{j=1}^{K} sigmoid(\hat{a}_j)} \quad \text{(Equation 18)}$$

Figure 3:
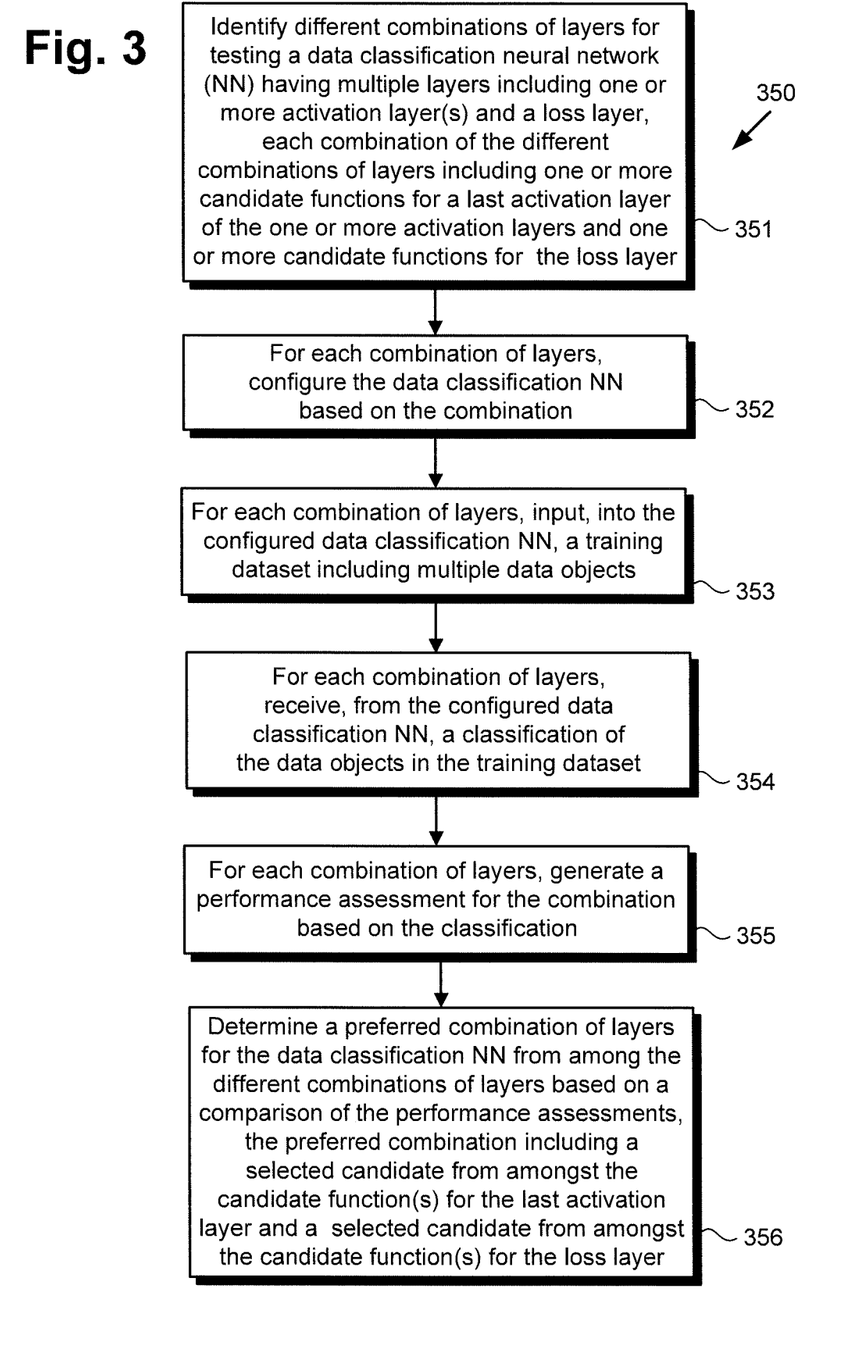
FIG. 3 shows a flowchart presenting an exemplary method for use by a system for classifying data objects to train a neural network using a noisy dataset, according to one implementation.

Software code 110 and data classification NN 140/240 will be further described by reference to FIG. 3 in combination with FIGS. 1 and 2. FIG. 3 shows flowchart 350 presenting an exemplary method for use by system 100 to train data classification NN 140/240 using a noisy dataset, such as training dataset 116/216, according to one implementation. With respect to the method outlined in FIG. 3, it is noted that certain details and features have been left out of flowchart 350 in order not to obscure the discussion of the inventive features in the present application.

Referring now to FIG. 3 in combination with FIGS. 1 and 2, flowchart 350 begins with identifying multiple different combinations of layers for testing data classification NN 140/240, where each combination of the different combinations of layers includes one or more candidate functions for last activation layer 242($n$) and one or more candidate functions for loss layer 244 (action 351). Some of the possible combinations of layers for testing data classification NN 140/240 are described above by reference to Equation 5 through Equation 17. Action 351 may be performed by software code 110, executed by hardware processor 104.

Flowchart 350 continues with, for each combination of the different combinations of layers identified in action 351, configuring data classification NN 140/240 based on that combination (action 352). For example, for the combination described by Equations 14, 15, and 16, data classification NN 140/240 would be configured to include sigmoid activation layer 242($n$-1) implementing a sigmoid activation function, softmax last activation layer 242($n$) implementing a softmax activation function, and CE loss layer 244 implementing a CE loss function. As another example, the combination described by Equation 17 would result in data classification NN 140/240 being configured to include sigmoid activation layer 242($n$-1) implementing a sigmoid activation function, $L_1$-normalization last activation layer 242($n$) implementing an $L_1$-normalization function, and CE loss layer 244 implementing a CE loss function, and so forth. Configuration of data classification NN 140/240 in action 352 may be performed by software code 110, executed by hardware processor 104.

Flowchart 350 continues with, for each combination of the different combinations of layers identified in action 351, inputting, into configured data classification NN 140/240, training dataset 116/216 including multiple data objects (action 353). The data objects included in training dataset 116/216 may take a variety of forms such as images, audio content, audio-visual content such as movies or television content, an electronic book or document (e-book or e-document), or a data structure, to name a few examples. Training dataset 116/216 may be provided as an input to configured data classification NN 140/240 by software code 110, executed by hardware processor 104.

Flowchart 350 continues with, for each combination of the different combinations of layers identified in action 351, receiving, from configured data classification NN 140/240, classification 118/218 of the data objects included in training dataset 116/216 (action 354). Classification 118/218 of the data objects included in training dataset 116/216 may be received from configured data classification NN 140/240 by software code 110, executed by hardware processor 104.

Flowchart 350 continues with, for each combination of the different combinations of layers identified in action 351, generating a performance assessment for that combination based on classification 118/218 (action 355). In some implementation, for example, the performance assessment for each combination of layers identified in action 351 may take the of the $F_1$ score or F-measure of classification 118/218 resulting from each of the different combinations of layers. The performance assessment for each of the combination of layers identified in action 351 may be generated by software code 110, executed by hardware processor 104.

According to the exemplary outline provided by FIG. 3, flowchart 350 concludes with determining a preferred combination of layers for data classification NN 140/240 from among the different combinations of layers identified in action 351 based on a comparison of the performance assessments generated in action 355, the preferred combination including a selected candidate from amongst the one or more candidate function for the last activation layer and a selected candidate from amongst the one or more candidate functions for the loss layer (action 356). For example, where the performance assessments take the form of $F_1$ scores or F-measures for each combination, the combination of layers having the highest $F_1$ score or F-measure may be determined to be the preferred combination of layers for optimizing data classification NN 140/240. The preferred combination of layers for optimizing the performance of data classification NN 140/240 may be determined by software code 110, executed by hardware processor 104.

In some implementations, the selected candidate for last activation layer 242($n$) of the preferred combination of layers may be one of a sigmoid activation function or a softmax activation function. In some implementations, the selected candidate for last activation layer 242($n$) may be a normalization layer, and the preferred combination of layers may include activation layer 242($n$-1) in the form of a sigmoid activation layer, followed by last activation layer 242($n$), followed by loss layer 244. In some such implementations, the selected candidate for that normalization layer, i.e., the selected candidate for last activation layer 242(n) may be one of a softmax activation function or an $L_1$-normalization function. In some implementations, the selected candidate for loss layer 244 may take the form of a CE loss function. For example, in implementations in which the preferred combination of layers includes activation layer 242(n−1) in the form of a sigmoid activation layer, followed by last activation layer 242(n) in the form of normalization layer, followed by loss layer 244, loss layer 244 may be a CE loss layer.

Figure 4:
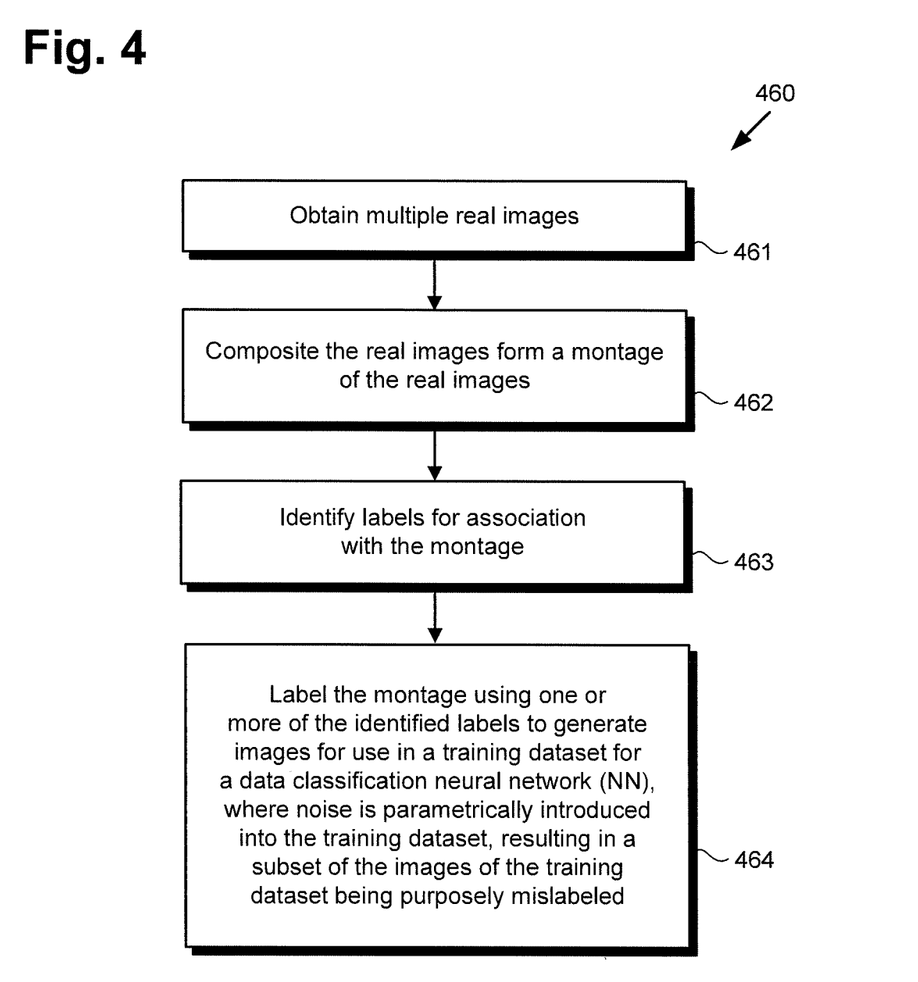
FIG. 4 shows a flowchart presenting an exemplary method for use by the system of FIG. 1 to generate a dataset for training a neural network to classify images, according to one implementation.

As noted above, in some implementations, training dataset 116/216 may include data objects including images. In some of those implementations, hardware processor 104 may execute software code 110 to generate the images included in training dataset 116/216. FIG. 4 shows flowchart 460 presenting an exemplary method for use by system 100, in FIG. 1, to generate training dataset 116/216 for training data classification NN 140/240 to classify images, according to one implementation, while FIG. 5 shows an exemplary diagram of a portion of such a training dataset as training dataset 516 including montage 570 of real images of numerals arranged within labeled tiles 572a, 572b, and 572c.

With respect to the method outlined in FIG. 4, it is noted that certain details and features have been left out of flowchart 460 in order not to obscure the discussion of the inventive features in the present application. Referring now to FIG. 4 in combination with FIG. 1, flowchart 460 begins with obtaining real images (action 461). In some implementations, the real images may be included in source data 114 obtained from dataset repository 120. In one implementation, for example, source data 114 including real images may be obtained from the Modified National Institute of Science and Technology (MNIST) dataset including real images of handwritten numerals. The real images included in source data 114 may be obtained from dataset repository 120 by software code 110, executed by hardware processor 104, via communication network 108 and network communication links 128.

Figure 5:
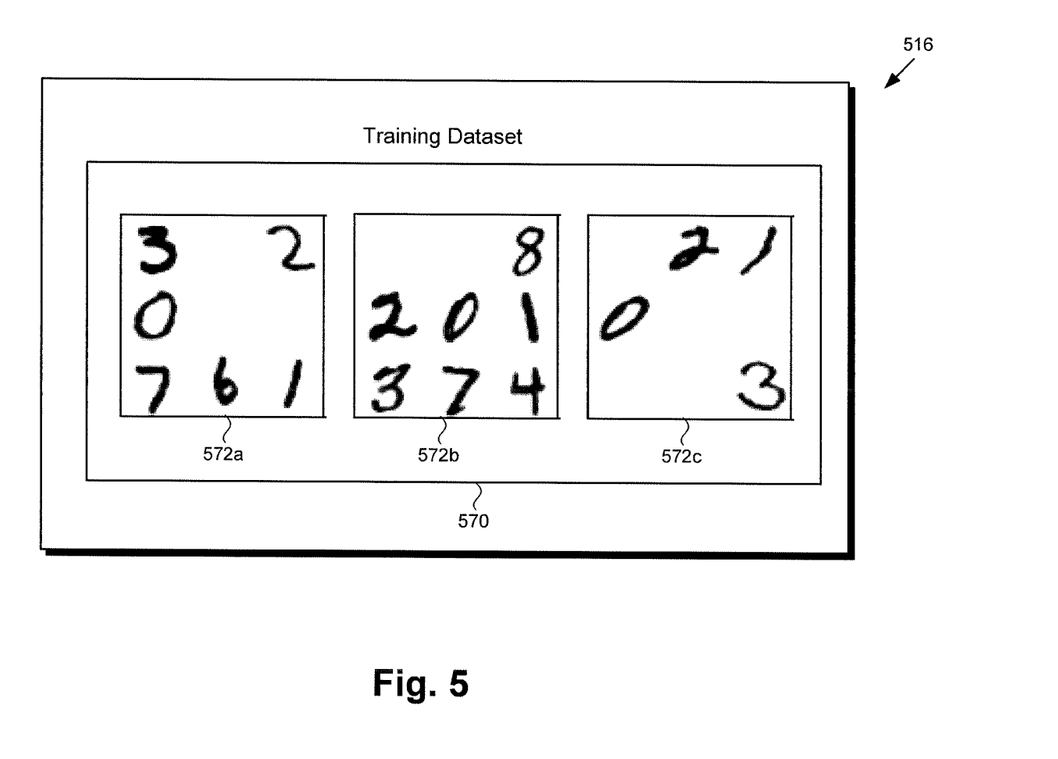
FIG. 5 shows an exemplary diagram of a portion of a dataset generated using the method outlined by the flowchart in FIG. 4, according to one implementation.

Referring to FIG. 4 with further reference to FIG. 5, flowchart 460 continues with compositing the real images obtained in action 461 to form montage 570 of the real images (action 462). In one such implementation, for example, the original images included in source data 114 may be composited into a montage of nine images. Compositing of the real images to form montage 570 may be performed by software code 110, executed by hardware processor 104.

Flowchart 460 continues with identifying multiple labels for association with montage 570 (action 463). By choice of parameter, the number of active labels is selected. In implementations in which the real images are composited into a montage of nine images, for example, action 463 can result in any of tiles 572a, 572b, or 572c of montage 570 being active with one to nine labels. In implementations in which training data 116/216 is generated from the MNIST dataset, training dataset 116/216 may include the same ten classes included in the MNIST dataset. The multi-label approach allows multiple numerals to be active where their positions are not important. Action 463 may be performed by software code 110, executed by hardware processor 104.

Flowchart 460 can conclude with labeling montage 570 using one or more of the labels identified in action 463 to generate the images of training dataset 116/216, where noise is parametrically introduced into training dataset 116/216, resulting in a subset of those images being purposely mislabeled (action 464). Action 464 may be performed by software code 110, executed by hardware processor 104.

In implementations in which the images included in training dataset 116/216 are generated based on the MNIST dataset, the images in training dataset 116/216 differ from those included in the MNIST dataset in three significant ways. First, unlike the images in the MNIST dataset, the images in training dataset 116/216 are multi-label. As noted above, the original images may be composited into a montage of nine images. As further noted above, by choice of parameter, the number of active labels is selected, which, referring to FIG. 5, results in any of tiles 572a, 572b, or 572c of montage 570 being active with one to nine labels.

A second difference between training dataset 116/216 and the MNIST dataset is that training dataset 116/216 contains structured class imbalances that may be denoted as "peaks." By choice of parameter, the number of peaks is chosen, i.e., the number of labels with high likelihood of being present. This results in a different label distribution, where certain labels may occur in almost every image. Extreme imbalance causes two behaviors: (1) the number of training images will be much higher in those cases, and (2) an "always-active" label is virtually irrelevant because when a label is always active there is nothing to learn.

A third difference between training dataset 116/216 and the MNIST dataset is that training dataset 116/216 contains structured noise in the form of the presence or absence of labels or images. Again by choice of parameter, the number of label switches is chosen. This results in a corrupted label distribution that is characterized by the number of false positives and false negatives. A false positive (in view of the labels) is an active label for which there is no underlying evidence in the image, i.e., the labeled numeral is not visible in the image. A false negative is an inactive label despite the presence of its corresponding numeral in the image. The choice of parameter determines the likelihood of each case and their combination results in a label switch, i.e., an extra numeral and an extra label but mismatched.

The overall distribution of training dataset 116/216 is characterized by the parameters discussed above. The value dp is the number of peaks, the value pn is the likelihood of noise, and the value pa determines the balance between false positives and false negatives. Other characteristics of the original MNIST dataset may be retained by training dataset 116/216, such that the images are real images hand-drawn by humans and labelled by humans. The images can be clean gray-scale images, where the image itself is not corrupted beyond human calligraphy.

Thus, in summary, the task is to learn a multi-label classification, and determine all active numerals in each image of training dataset 116/216. Using combinations of images in source data 114, any number of training and testing examples can be generated. It is noted that the true ground truth of source data 114 is recorded, which contains the actual presence of numerals in each image, in contrast to the above described corrupted ground truth resulting from the purposeful introduction of noise into training dataset 116/216.

With respect to the methods outlined by flowcharts 350 and 460, it is noted that, in some implementations, hardware processor 104 may execute software code 110 to perform actions 351, 352, 353, 354, 355, and 356, and/or actions 461, 462, 463, and 464, in an automated process from which human involvement may be omitted.

Thus, the present application discloses systems and methods for performing data object classification using an optimized neural network that overcome the drawbacks and deficiencies in the conventional art. Due to the improved performance of data classification NN 140/240 during deep learning made possible by the NN optimization solution disclosed by the present application, several distinct improvements over the state-of-the-art result. Examples of such improvements include enabling the learning to take place on high-variation and highly unstructured datasets, improved handling of extreme frequency noise in a dataset, easier applicability due to the parameter-free normalization, faster convergence, i.e., less time and energy required in deep learning, as well as improved recall of labels at a predetermined precision level, and vice versa. In addition, the overall training process is less costly due to the reduced resource requirements, while resulting in data classification NN 140/240 having superior classification accuracy.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for classifying data objects, the system comprising:
    a computing platform including a hardware processor and a system memory;
    a software code and a neural network (NN) stored in the system memory, the NN having a plurality of layers including one or more activation layers and a loss layer, the one or more activation layers comprising a last activation layer;
    the hardware processor configured to execute the software code to:
        identify a plurality of different combinations of layers for testing the NN, each combination of the plurality of different combinations of layers including one or more candidate functions for the last activation layer and one or more candidate functions for the loss layer;
        for each combination of the plurality of different combinations of layers:
            configure the NN based on the each combination;
            input, into the configured NN, a training dataset including a plurality of data objects;
            receive, from the configured NN, a classification of the plurality of data objects in the training dataset;
            generate a performance assessment for the each combination based on the classification; and
        determine a preferred combination of layers for the NN from among the plurality of different combinations of layers based on a comparison of the performance assessments, the preferred combination of layers comprising a selected candidate amongst the one or more candidate functions for the last activation layer and a selected candidate amongst the one or more candidate functions for the loss layer.

2. The system of claim 1, wherein the selected candidate for the last activation layer of the preferred combination of layers is a softmax activation function, and wherein the last activation layer follows a sigmoid activation layer.

3. The system of claim 1, wherein the one or more activation layers includes an additional normalization layer, and wherein each combination of the plurality of different combinations of layers further includes one or more candidate functions for the additional normalization layer.

4. The system of claim 3, wherein the selected candidate for the last activation layer is one of a sigmoid activation function, a softmax activation function, or an $L_1$-normalization function.

5. The system of claim 3, wherein the selected candidate for the loss layer comprises a cross entropy loss function.

6. The system of claim 1, wherein the plurality of data objects in the training dataset comprises a plurality of images.

7. The system of claim 6, wherein the hardware processor is further configured to execute the software code to generate the plurality of images in the training dataset.

8. The system of claim 6, wherein the hardware processor is further configured to execute the software code to:
    obtain a plurality of real images;
    composite the plurality of real images to form a montage of the plurality of real images;
    identify a plurality of labels for association with the montage;
    label the montage using one or more of the plurality of identified labels to generate the plurality of images in the training dataset;
    wherein noise is parametrically introduced into the training dataset, resulting in a subset of the plurality of images being purposely mislabeled.

9. The system of claim 8, wherein a plurality of parameters utilized to introduce the noise into the training dataset comprises a number of peaks (dp) in the training dataset, a likelihood of noise (pn) in the training dataset, and a balance (pa) between false positives and false negatives in the training dataset.

10. A method for use by a system for classifying data objects, the system including a computing platform having a hardware processor and a system memory storing a software code and a neural network (NN), the NN having a plurality of layers including one or more activation layers and a loss layer, the or more activation layers comprising a last activation layer, the method comprising:
    identifying, by the software code executed by the hardware processor, a plurality of different combinations of layers for testing the NN, each combination of the plurality of different combinations of layers including one or more candidate functions for the last activation layer and one or more candidate functions for the loss layer;
    for each combination of the plurality of different combinations of layers:
        configuring, by the software code executed by the hardware processor, the NN based on the each combination;
        inputting into the configured NN, by the software code executed by the hardware processor, a training dataset including a plurality of data objects;
        receiving from the configured NN, by the software code executed by the hardware processor, a classification of the plurality of data objects in the training dataset;
        generating, by the software code executed by the hardware processor, a performance assessment for the each combination based on the classification; and determining, by the software code executed by the hardware processor, a preferred combination of layers for the NN from among the plurality of different combinations of layers based on a comparison of the performance assessments, the preferred combination of layers comprising a selected candidate amongst the one or more candidate functions for the last activation layer and a selected candidate amongst the one or more candidate functions for the loss layer.

11. The method of claim 10, wherein the selected candidate for the last activation layer of the preferred combination of layers is a softmax activation function, and wherein the last activation layer follows a sigmoid activation layer.

12. The method of claim 10, wherein the one or more activation layers includes an additional normalization layer, and wherein each combination of the plurality of different combinations of layers further includes one or more candidate functions for the additional normalization layer.

13. The method of claim 12, wherein the selected candidate for the last activation layer is one of a sigmoid activation function, a softmax activation function, or an $L_1$-normalization function.

14. The method of claim 12, wherein the selected candidate for the loss layer comprises a cross entropy loss function.

15. The method of claim 10, wherein the plurality of data objects in the training dataset comprises a plurality of images.

16. The method of claim 15, further comprising generating, by the software code executed by the hardware processor, the plurality of images in the training dataset.

17. The method of claim 15, further comprising:
obtaining, by the software code executed by the hardware processor, a plurality of real images;
compositing, by the software code executed by the hardware processor, the plurality of real images to form a montage of the plurality of real images;
identifying, by the software code executed by the hardware processor, a plurality of labels for association with the montage; and
labeling, by the software code executed by the hardware processor, the montage using one or more of the plurality of identified labels to generate the plurality of images in the training dataset;
wherein noise is parametrically introduced into the training dataset, resulting in a subset of the plurality of images being purposely mislabeled.

18. The method of claim 17, wherein a plurality of parameters utilized to introduce the noise into the training dataset comprises a number of peaks (dp) in the training dataset, a likelihood of noise (pn) in the training dataset, and a balance (pa) between false positives and false negatives in the training dataset.

19. A method for use by a system having a hardware processor and a system memory storing a software code and a neural network (NN), to generate a training dataset for training the NN to classify images, the method comprising:
obtaining, by the software code executed by the hardware processor, a plurality of real images;
compositing, by the software code executed by the hardware processor, the plurality of real images to form a montage of the plurality of real images;
identifying, by the software code executed by the hardware processor, a plurality of labels for association with the montage; and
labeling, by the software code executed by the hardware processor, the montage using one or more of the plurality of identified labels to generate the training dataset;
wherein noise is parametrically introduced into the training dataset, resulting in a subset of the training dataset being purposely mislabeled.

20. The method of claim 19, wherein a plurality of parameters utilized to introduce the noise into the training dataset comprises a number of peaks (dp) in the training dataset, a likelihood of noise (pn) in the training dataset, and a balance (pa) between false positives and false negatives in the training dataset.

* * * * *